(12) United States Patent
Nove

(10) Patent No.: US 6,406,219 B1
(45) Date of Patent: Jun. 18, 2002

(54) GREENHOUSE GAS EMISSION DISPOSAL FROM THERMAL POWER STATIONS

(76) Inventor: Jolyon E. Nove, 2A Kalgoorlie Street, Willoughby NSW 2068 (AU)

( * ) Notice: Subject to any disclaimer, the term of this patent is extended or adjusted under 35 U.S.C. 154(b) by 0 days.

(21) Appl. No.: 09/651,333

(22) Filed: Aug. 31, 2000

(51) Int. Cl.[7] .............................. B01D 53/14; B09B 1/00
(52) U.S. Cl. .............................. 405/129.25; 405/129.85; 95/226; 95/236
(58) Field of Search .............................. 405/78, 129.25, 405/129.85; 423/220; 261/1, 77, DIG. 7, DIG. 75; 95/26, 151, 224, 226, 232, 236; 60/721

(56) References Cited

U.S. PATENT DOCUMENTS

| | | | | |
|---|---|---|---|---|
| 838,587 A | * | 12/1906 | von Schon | 405/78 |
| 4,869,017 A | * | 9/1989 | Bird et al. | 47/1.4 |
| 4,899,544 A | * | 2/1990 | Boyd | 60/618 |
| 5,261,490 A | * | 11/1993 | Ebinuma | 166/266 |
| 5,304,356 A | * | 4/1994 | Iijima et al. | 422/226 |
| 5,364,611 A | * | 11/1994 | Iijima et al. | 423/437 R |
| 5,662,837 A | | 9/1997 | Saito et al. | |
| 5,785,930 A | | 7/1998 | Sinclair | |
| 6,190,301 B1 | * | 2/2001 | Murray et al. | 588/250 |
| 6,254,667 B1 | * | 7/2001 | Saito et al. | 95/254 |

FOREIGN PATENT DOCUMENTS

| | | | |
|---|---|---|---|
| FR | 2 794 454 | * | 12/2000 |
| JP | 1-94916 | * | 4/1989 |
| JP | 2-80316 | * | 3/1990 |
| JP | 403154616 A | | 7/1991 |
| JP | 3-188924 | * | 8/1991 |
| JP | 3-188924 | | 9/1991 |
| JP | 404022430 A | | 1/1992 |
| JP | 404029738 A | | 1/1992 |
| JP | 05277357 A | | 10/1993 |
| JP | 6-226047 | | 8/1994 |
| JP | 8-103649 | * | 4/1996 |
| JP | 10-305212 | * | 11/1998 |
| JP | 2000-24455 | * | 1/2000 |
| JP | 2000-61301 | * | 2/2000 |
| JP | 2000-61302 | * | 2/2000 |
| JP | 2000-70702 | * | 3/2000 |
| WO | WO 9416992 | | 8/1994 |

OTHER PUBLICATIONS

Trefil, J; "Phenomena, Comment and Notes"; Smithsonian vol. 27, No. 9; Dec. 1996; pp. 30–32; Dec. 1996.
Ebbing, D.D.; General Chemistry; Fifth Edition; 1996; p 499.
Ebbing, D.D.; General Chemistry; Fifth Edition; 1996; p 579.

* cited by examiner

Primary Examiner—H. Shackelford
Assistant Examiner—Gary S. Hartmann
(74) Attorney, Agent, or Firm—Larson & Taylor, PLC

(57) ABSTRACT

A process is provided for reducing a greenhouse gas emission component of a combustion gas from a thermal power generation plant. The thermal power generation plant is located in a coastal region adjacent the ocean. The plant is located beneath a seawater reservoir and a discharge line via a cooling water loop provides cooling water to the power station. The discharge line in turn feeds a modified hydroelectric plant and an intake pipe is located with its outlet beneath the ocean surface. A bypass line is connected to the discharge line 14 and extends to deep ocean sinks. In operation, seawater is pumped from the ocean to the elevated reservoir via the intake pipe and discharge line and thereafter combustion gas from the flue stack or emission system of the power station is injected into the discharge line. Electricity is generated by the power station during peak demand periods. The seawater stream into which the combustion gas is injected is under pressure via the head of water exerted by the seawater reservoir. Thus, the absorption of greenhouse gases within the seawater stream is enhanced.

7 Claims, 2 Drawing Sheets

GREENHOUSE GAS EMISSION DISPOSAL FROM THERMAL POWER STATIONS

FIELD OF THE INVENTION

The present invention relates generally to a process for reducing a greenhouse gas emission component of a combustion gas from a thermal power generation plant.

BACKGROUND OF THE INVENTION

The applicant has as disclosed in International patent application No. PCT/AU96/00619 developed a method of reducing greenhouse gas emissions in a combustion gas from a power station. The method involves passing the combustion gas from an exhaust stack of the power station through a catalytic converter to enrich the level of NOX in the gas. The enriched combustion gas is then diverted to a gloryhole spillway of the power station where the enriched combustion gas together with its greenhouse gas emissions is contacted with cooling seawater being discharged form the station. The applicant has found that contacting the combustion gas with seawater flowing through the gloryhole spillway is a relatively inefficient way of absorbing or dissolving the greenhouse gas emissions which are then released to the ocean.

SUMMARY OF THE INVENTION

An object of the present invention is to provide a process for efficiently reducing greenhouse emissions from a thermal power generation plant.

According to the present invention, there is provided a process for reducing a greenhouse gas emission component of a combustion gas from a thermal power generation plant, said process comprising:

injecting the combustion gas via an injection line into a discharge line through which a pressurized seawater stream from an elevated reservoir flows under a hydrostatic head so as to effectively dissolve or absorb at least a portion of the greenhouse gas emission component in the pressurized seawater stream to form a loaded seawater stream;

discharging the loaded seawater stream to an ocean via a bypass line or other outlet connected to the discharge line, whereby the emission of said greenhouse gas to the atmosphere is reduced; and pumping seawater from the ocean to the elevated reservoir via the discharge line.

Preferably, injection of the combustion gas is conducted at times of non-peak power demand.

Advantageously, the thermal power generation plant operates in sequence with further use of the pressurized seawater stream including:

i) pumping of the seawater from the ocean;

ii) injecting the greenhouse gas into the seawater stream flowing under the effect of gravity into the ocean;

iii) generating peak electricity.

The process preferably further includes generating power via a hydroelectric power plant, the hydroelectric plant being operatively coupled to the discharge line.

Advantageously, a pre-conditioning step of passing the combustion gas through a catalytic converter is provided so as to increase in said combustion gas greenhouse gas concentration prior to contacting the combustion gas with the pressurized seawater stream.

Preferably, the discharge or disposal of the loaded seawater stream to the ocean including locating an outlet of the bypass line to flow into a deep ocean sink. Advantageously, the bypass line includes other outlets at predetermined depths so that the greenhouse gas component of the loaded seawater stream assists in marine growth.

In general, the pressurized liquid stream is seawater. Preferably, the seawater is a cooling stream of the thermal power station. More preferably, pressurization of the seawater cooling stream is effected by an elevated reservoir of said seawater which produces a hydrostatic head within the seawater stream.

Preferably, the combustion gas is injected into the seawater under pressure. Advantageously, the combustion gas is injected via an injection line into a discharge line through which the seawater flows. In one embodiment, the injection line is tapped just downstream of combustion gas pumps which are connected to a flue stack or emission system of the thermal plant.

Preferably, the loaded liquid stream is discharged to the liquid body, such as the ocean, via a bypass line which is connected to the discharge line.

Preferably, injection of the combustion gas into the pressurized stream is in sequence with other uses of the pressurized stream. Advantageously, injection of the combustion gas is conducted at times of non-peak power demand.

Advantageously, the thermal power generation plant operates on the following cycle:

i) pumping of seawater from the ocean to the elevated reservoir via the discharge line;

ii) injecting the greenhouse gas into the seawater stream flowing under the effect of gravity from the elevated reservoir via the discharge line and the bypass line into the ocean; and iii) generating peak electricity.

In one embodiment the periods for which steps i), ii) and iii) are performed daily are approximately 12, 10 and 2 hours, respectively. Accordingly, the process can be specifically designed to provide relatively high levels of power generation during peak periods and reduced power generation during off-peak periods. By varying the parameters of time, size of equipment such as pumps, and pressure, greenhouse gas emissions can be reduced from between 0 and 100%.

Advantageously, the process for reducing greenhouse gas emissions includes the step of pumping seawater from the ocean to the elevated reservoir via the discharge line. In this instance, one or more pumps are used to pump seawater to the reservoir. Typically seawater is pumped from the ocean via one or more seawater intake pipes.

Preferably, the process also involves generating power via a generator of a conventional hydroelectric power plant, the hydroelectric plant being operatively coupled to the discharge line. Power generation by the hydroelectric plant is connected to the electrical grid.

The process for reducing greenhouse gas emissions preferably includes a pre-conditioning step of passing the combustion gas through a catalytic converter so as to vary the composition of greenhouse gases prior to contacting the combustion gas with the pressurized liquid stream.

Preferably, the discharge or disposal of the loaded liquid stream to the ocean involves locating an outlet of the bypass line so the discharge will flow to a relatively deep ocean sink. Additionally, the bypass line may include other outlets being arranged at predetermined depths so that the greenhouse gas component of the loaded liquid-stream assists in marine growth.

BRIEF DESCRIPTION OF THE DRAWINGS

In order to achieve a better understanding of the nature of the present invention, preferred embodiments of a process for reducing greenhouse gas emissions from a thermal power generation plant will now be described, by way of example only, with reference to the accompanying illustrations in which.

DESCRIPTION OF THE PREFERRED EMBODIMENTS

Figure 1:
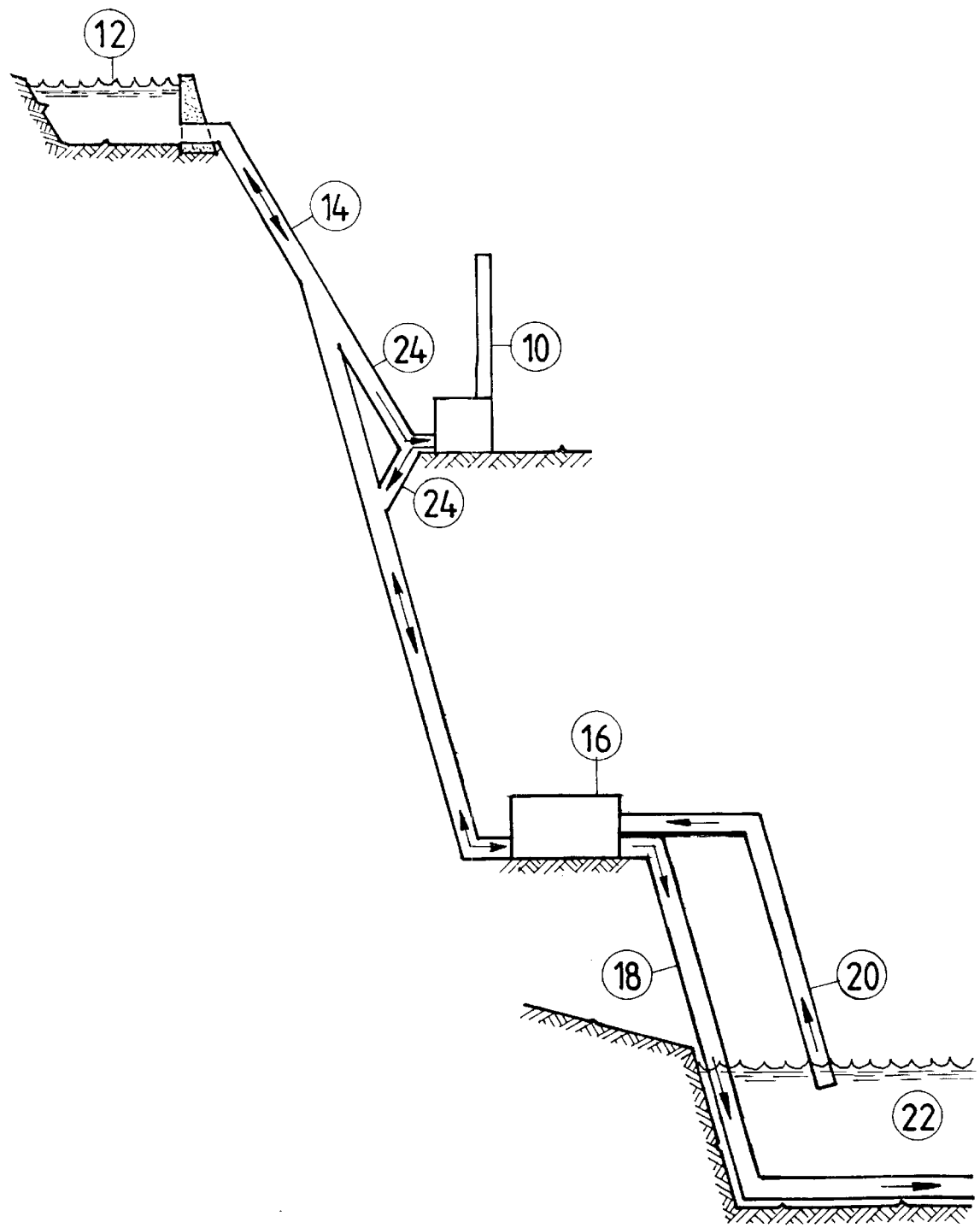
FIG. 1 is a schematic representation of a thermal power generation plant being adapted to be suitable for one embodiment of the process of the present invention.

As shown in FIG. 1 there is a conventional thermal power generation plant 10, an elevated reservoir 12, a discharge line 14, a modified hydroelectric power plant 16 including bypass valving and one or more pumps, a bypass line 18, and one or more intake pipes that are indicated at 20.

In the embodiment shown in FIG. 1, the thermal power generation plant 10 is located in a coastal region adjacent the ocean 22 which constitutes the liquid body. The intake pipes 20 are located just beneath a low water level of the ocean 22 whereas an outlet of the bypass line 18 is located at a relatively deep ocean sink. Other outlets may be provided in the bypass line 18 at predetermined depths so as to discharge greenhouse gases of a loaded liquid stream to assist in marine growth.

The reservoir 12 is coupled to the modified hydroelectric plant 16 via the discharge line 14. The thermal power generation plant 10 is operatively coupled to the discharge line 14 via a cooling water loop 24. The discharge line 14 is in turn coupled to the intake pipe 20 via the respective bypass valve and pump (not shown). The bypass line 18 is connected to the discharge line 14.

The general cycle steps involved in operation of the thermal power generation plant 10 and overall assembly described above are as follows:

(i) seawater from the ocean 22 is pumped to the elevated reservoir 12 via the intake pipe 20 and discharge line 14;

(ii) combustion gas including a greenhouse gas component from the flue stack or emission system of the thermal power generation plant is injected into the discharge line 14; and (iii) electricity is generated by the thermal power station 10 during peak demand periods.

It should be apparent that during step (i) of the cycle the bypass valve is opened to permit pumping of seawater form the ocean 22 via the intake pipe 20 and discharge line 14 to the reservoir 12. During step (ii) of the cycle, the bypass valve is closed so that seawater flowing through the discharge line 14, into which the greenhouse gas emissions are injected, flows to the bypass line 18 into the ocean 22.

In this particular embodiment the seawater including absorbed or dissolved greenhouse gas emissions, known as the loaded seawater, drives one or more turbines (not shown) in the hydroelectric plant 16 so as to generate additional power to that of the thermal power generation plant 10. Step (iii) of the cycle involves generating peak electricity via the thermal power station 10 with seawater being diverted from the discharge line 14 and through the cooling water loop 24 of the thermal power station 10. This cooling water may also be used to drive the turbines of the hydroelectric plant 16 to produce additional power. In this mode the cooling water is discharged to the ocean 22 via the bypass line 18. The pumps of the hydroelectric station 16 may be electrically driven by power generated from the thermal power station 10.

Figure 2:
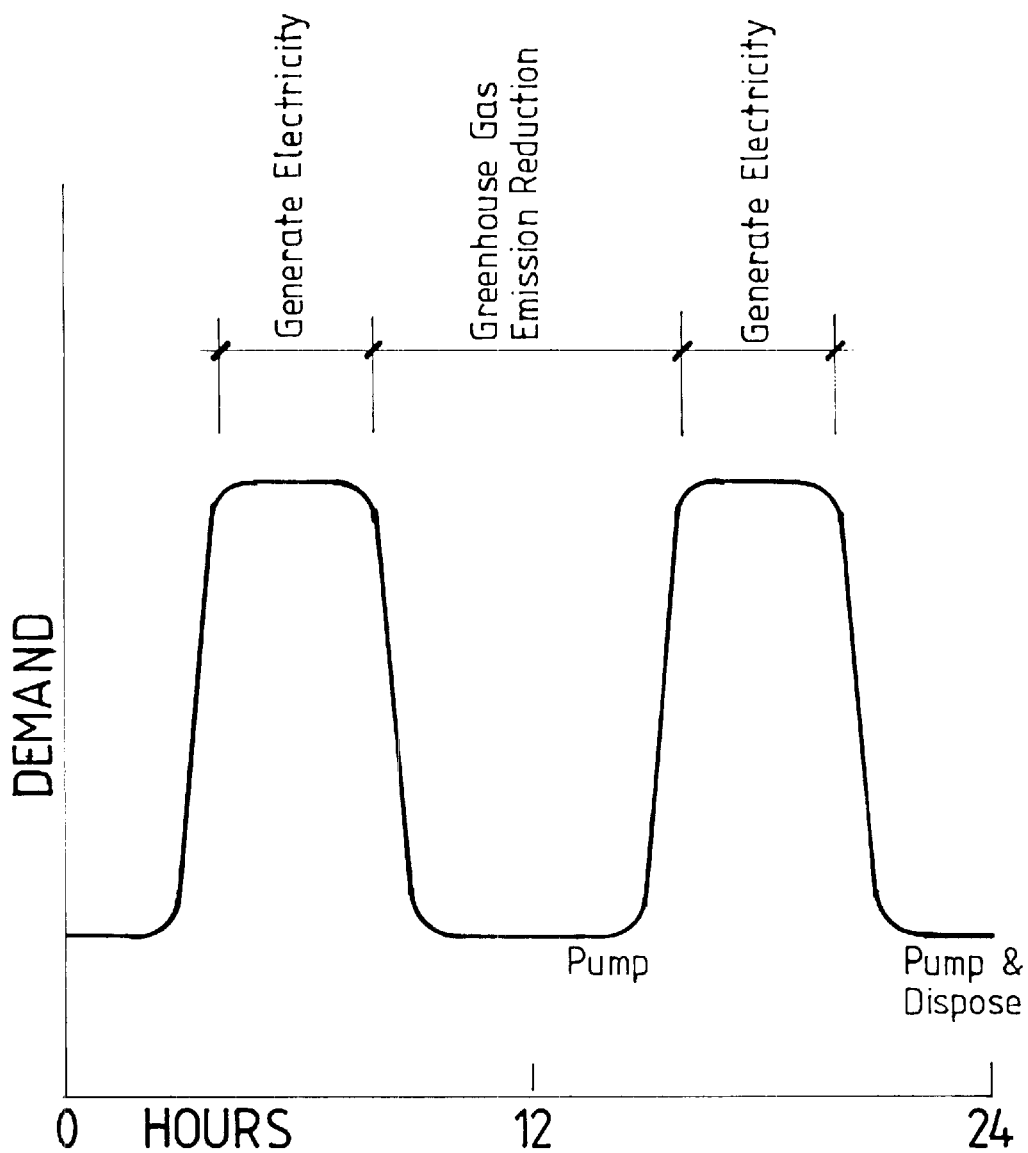
FIG. 2 is a graph showing a typical power demand cycle for the thermal power generation plant.

FIG. 2 graphically depicts a twenty four hour cycle of power generation using the thermal power generation plant 10. In a typical cycle, seawater may be pumped to the reservoir 12 for a twelve hour period, power generated by the thermal power station 10 for a two hour peak demand period, and the combustion gas, and in particular the greenhouse gas emissions of the thermal power generation plant, injected into the discharge line 14 for the remaining ten hours.

An important feature of the described embodiment of the invention is pressurization of the seawater or liquid stream flowing through the discharge line 14 into which the greenhouse gases are injected. The elevated reservoir 12 has the effect of providing a pressurized column of seawater in the discharge line 14 and bypass line 18. The pressurized seawater will more readily, and thus more effectively, dissolve or absorb the greenhouse gas emissions of the combustion gas thereby minimizing any discharge of the greenhouse gases to the atmosphere. Further, the greenhouse gas components, such as NOX gases, when discharged into the ocean 22 can assist in marine growth. In another example, $CO_2$ gas when discharged into surface levels of the ocean under photosynthesis converts into plankton.

In one embodiment of the process for reducing greenhouse gas emissions, the combustion gas is preconditioned via a catalytic converter so as to increase the concentration therein of greenhouse gases. The enriched combustion gas is then contacted with, or injected into, the seawater stream of the discharge line 14 and the enriched combustion gas provides additional nutrients to the ocean 22. The bypass line 18 may include additional outlets arranged at varying depths depending on any enrichment requirements of the system.

Now that a preferred embodiment of the present invention has been described in some detail it will be apparent to those skilled in the art that the process for reducing greenhouse gas emissions from a thermal power generation plant has at least the following advantages:

(i) greenhouse gas emissions of a combustion gas from a thermal power generation plant can effectively be dissolved or absorbed in a pressurized liquid stream;

(ii) a thermal power generation plant can effectively operate on a cycle where the bulk of power is generated during peak demand periods;

(iii) power generation during off-peak periods for the majority of the power generation cycle has minimal greenhouse gas emissions; and (iv) additional power may be generated by a hydroelectric plant driven by the stream of pressurized liquid in which the combustion gas is dissolved or absorbed, this power being connected to the grid of the thermal power generation plant.

Those skilled in the art will appreciate that the invention described herein is susceptible to variations and modifications other than those specifically described. For example, injection of the combustion gas into the discharge line may be effected via a variety of means including one wherein an injection line is tapped upstream of combustion gas pumps and into the discharge line. The combustion gas may also be injected into the cooling water loop of the thermal power generation plant. The particular process steps involved in reduction of greenhouse gas emissions may vary greatly provided the combustion gas is contacted with a pressurized liquid stream.

All such variations and modifications are to be considered within the scope of the present invention the nature of which is to be determined from the foregoing description.

What is claimed is:

1. A process for reducing a greenhouse gas emission component of a combustion gas from a thermal power generation plant, said process comprising:

injecting the combustion gas via an injection line into a discharge line through which a pressurized seawater stream from an elevated reservoir flows under a hydrostatic head so as to effectively dissolve or absorb at least a portion of the greenhouse gas emission component in the pressurized seawater stream to form a loaded seawater stream;

discharging the loaded seawater stream to an ocean via a bypass line or other outlet connected to the discharge line, whereby the emission of said greenhouse gas to the atmosphere is reduced; and pumping seawater from the ocean to the elevated reservoir via the discharge line.

2. A process as defined in claim 1 further including generating power via a hydroelectric power plant, the hydroelectric plant being operatively coupled to the discharge line.

3. A process as defined in claim 1 including a preconditioning step of passing the combustion gas through a catalytic converter so as to increase in said combustion gas greenhouse gas concentration prior to contacting the combustion gas with the pressurized seawater stream.

4. A process as defined in claim 1 wherein the discharge or disposal of the loaded seawater stream to the ocean includes locating an outlet of the bypass line to flow into a deep ocean sink.

5. A process as defined in claim 1 wherein the bypass line includes other outlets arranged at predetermined depths so that the greenhouse gas component of the loaded seawater stream assists in marine growth.

6. A process as defined in claim 1 wherein the thermal power generation plant operates in sequence with further uses of the pressurized seawater stream including:

i) pumping of the seawater from the ocean;

ii) injecting the greenhouse gas into the seawater flowing under the effect of gravity into the ocean;

iii) generating peak electricity.

7. A process as defined in claim 1 wherein injection of the combustion gas is conducted at times of non-peak power demand.

* * * * *